United States Patent [19]

Kawamoto et al.

[11] Patent Number: 4,705,135
[45] Date of Patent: Nov. 10, 1987

[54] FRONT AND REAR WHEEL STEERING DEVICE

[75] Inventors: Yoshimichi Kawamoto; Yoshimi Furukawa; Tetsuro Hamada; Mitsuya Serizawa, all of Tochigi, Japan

[73] Assignee: Honda Giken Kogyo Kabushiki Kaisha, Tokyo, Japan

[21] Appl. No.: 822,293

[22] Filed: Jan. 24, 1986

[30] Foreign Application Priority Data

| Jan. 24, 1985 | [JP] | Japan | 60-011827 |
| Jan. 24, 1985 | [JP] | Japan | 60-011828 |
| Jan. 24, 1985 | [JP] | Japan | 60-011829 |
| Jan. 24, 1985 | [JP] | Japan | 60-011830 |
| Jan. 24, 1985 | [JP] | Japan | 60-011831 |

[51] Int. Cl.$^4$ .................................. B60K 17/358
[52] U.S. Cl. ............................. 180/236; 180/143; 280/91; 364/424
[58] Field of Search ............ 280/91; 180/141, 142, 180/143, 234, 236, 271; 364/424

[56] References Cited

U.S. PATENT DOCUMENTS

| 3,596,730 | 8/1971 | Cecce | 180/236 |
| 4,313,514 | 2/1982 | Furukawa et al. | 280/91 |
| 4,467,885 | 8/1984 | Furukawa et al. | 280/91 |
| 4,572,316 | 2/1986 | Kanazawa et al. | 280/91 |

FOREIGN PATENT DOCUMENTS 58-243352 12/1983 Japan.

Primary Examiner—John J. Love
Assistant Examiner—Kenneth R. Rice
Attorney, Agent, or Firm—Lyon & Lyon

[57] ABSTRACT

The front and rear wheel steering device of the present invention not only has a means for allowing the manual selection of a mathematical function which determines the steering angle ratio of the rear wheels relative to the front wheels from a plurality of mathematical functions but also has a means for limiting such a manual selection depending on the condition of the vehicle. Since manual selection of a mathematical function for the steering angle ratio may not be appropriate under certain vehicle conditions, the device of the present invention limits such a manual selection when the vehicle speed, the vehicle acceleration, the shift position of the transmission, the steering speed or the steering acceleration is greater than a certain value. Thereby, the convenience of the manual selection of the steering angle ratio is preserved yet any undesirable vehicle response from improper manual selection of the steering angle ratio is prevented.

9 Claims, 11 Drawing Figures

FIG. 3
(a) 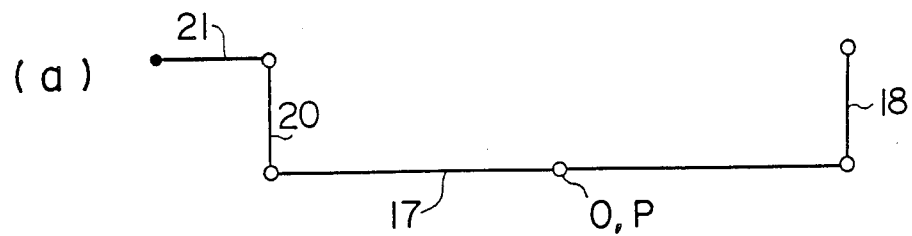
(b) 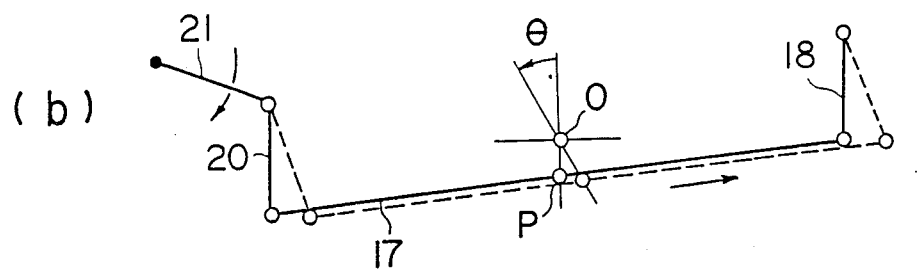
(c) 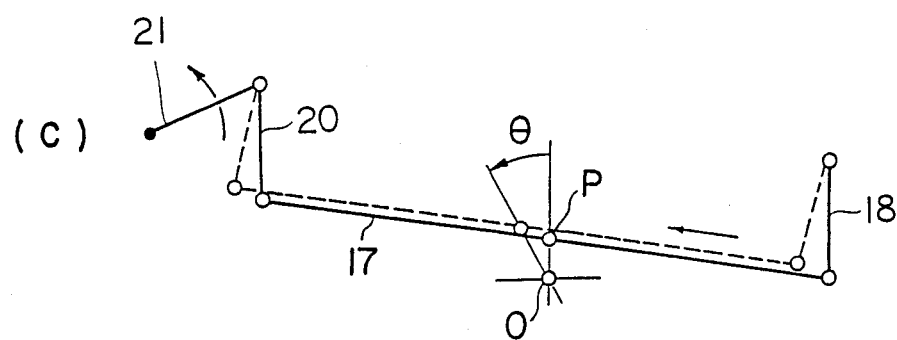

FRONT AND REAR WHEEL STEERING DEVICE

FIELD OF THE INVENTION

This invention relates to an improvement of a front and rear wheel steering device for vehicle which can variably control the steering angle of the rear wheels in relation with the steering angle of the front wheels.

DESCRIPTION OF THE PRIOR ART

There have been a number of proposals to provide front and rear wheel steering devices particularly in the form of four wheel steering devices. For instance, Japanese Patent Application No. 53-163678 (Japanese Patent Laying-Open Publication No. 55-91457) corresponding to U.S. Pat. No. 4,313,514, filed by the Assignee of the present application, proposes a front and rear wheel steering device for a vehicle which steers the rear wheels in relation with the steering of the front wheels in the same phase relationship in high speed range and in the opposite phase relationship in low speed range. The steering angle ratio may be a continuous function relative to the vehicle speed, for instance, as indicated by "Q" in FIG. 5.

Thus, a continuous control of the steering angle ratio is performed according to this continuous function Q so that the function of the steering device may be favorable in both high speed and low speed ranges. Specifically, the minimum angle of turning and the inner radius difference of the vehicle are both drastically reduced and the maneuverability of the vehicle, particularly in low speed range, in driving the vehicle into a garage, driving the car through narrow and crooked alleys and making a U-turn are substantially improved with the additional advantage of improving the dynamic lateral response of the vehicle in high speed range.

Further, the present Assignee has proposed a front and rear wheel steering device according to which the properties of the steering angle ratio function can be manually selected (Japanese Patent Application No. 58-243352). This device allows the properties of the mathematical function for the steering angle ratio to be changed according to the liking of the driver and the road conditions so that the modes of the front and rear wheel steering can be freely changed for easier driving, or for more sportive driving.

According to this proposal, the convenience for the driver may be enhanced, but if a driver who is not properly accustomed to such a device makes a drastic change in the properties of the steering ratio function under certain vehicle conditions, the driver may be required to make some corrective actions in order to cope with sudden changes in the dynamic properties of the vehicle due to the sudden change in the steering angle of the rear wheels resulting from the switch-over of the mathematical function.

SUMMARY OF THE INVENTION

In view of such problems, a primary object of this invention is to provide a front and rear wheel steering device for a vehicle according to which the driver is not required to take a quick action because of any sudden change in the dynamic properties of the vehicle when the properties of the steering angle ratio function is manually changed.

Another object of the present invention is to provide a front and rear wheel steering device for a vehicle according to which the convenience of manually selecting the steering angle ratio properties and easy driving at all times are attained at the same time.

According to the present invention, such objects are accomplished by providing a front and rear wheel steering device for vehicle for variably controlling the steering angle ratio of rear wheels relative to the steering angle of front wheels according to vehicle speed, comprising: a vehicle speed sensor for detecting an actual vehicle speed; storage means for storing a plurality of mathematical functions, including a default mathematical function, representing different steering angle ratio characteristics; manual selection means for selecting one of the mathematical functions of the vehicle speed stored in the storage means; means for achieving a steering angle ratio according to the mathematical function selected on the manual selection means; limiting means which prohibits the manual selection of the mathematical functions other than the default mathematical function according to a predetermined vehicle condition.

According to a certain aspect of the present invention, manual selection of the steering angle ratio property is possible only when the vehicle speed is below a certain value. Thus, by allowing the action of the manual selection means only in low speed range, any sudden change in the dynamic properties of the vehicle can be avoided by restricting the change in the properties of the steering angle ratio function in medium to high speed ranges where such a sudden change in the dynamic properties of the vehicle could cause an inconvenience.

According to other aspects of the present invention, manual selection of the steering angle ratio property is possible only when the vehicle acceleration is below a certain level, when the shift position of the transmission of the vehicle is in a low speed range, when the steering speed is below a certain level or when the change rate of the steering speed is below a certain level.

Thus, by allowing the action of the manual selection means only when the vehicle condition allows a manual selection of the steering angle ratio property, any undesirable sudden change in the dynamic properties of the vehicle can be avoided and easy driving is assured at all times.

BRIEF DESCRIPTION OF THE DRAWINGS

Such and other objects and advantages of the present invention will be better understood with reference to the following description and the appended drawings in which:

FIGS. 3(*a*), (*b*) and (*c*) are skeleton diagrams of the rear wheel steering system of FIG. 2, illustrating the working principle thereof;

DETAILED DESCRIPTION OF THE PREFERRED EMBODIMENTS

Now embodiments of this invention are described in the following with reference to the appended drawings.

Figure 1:
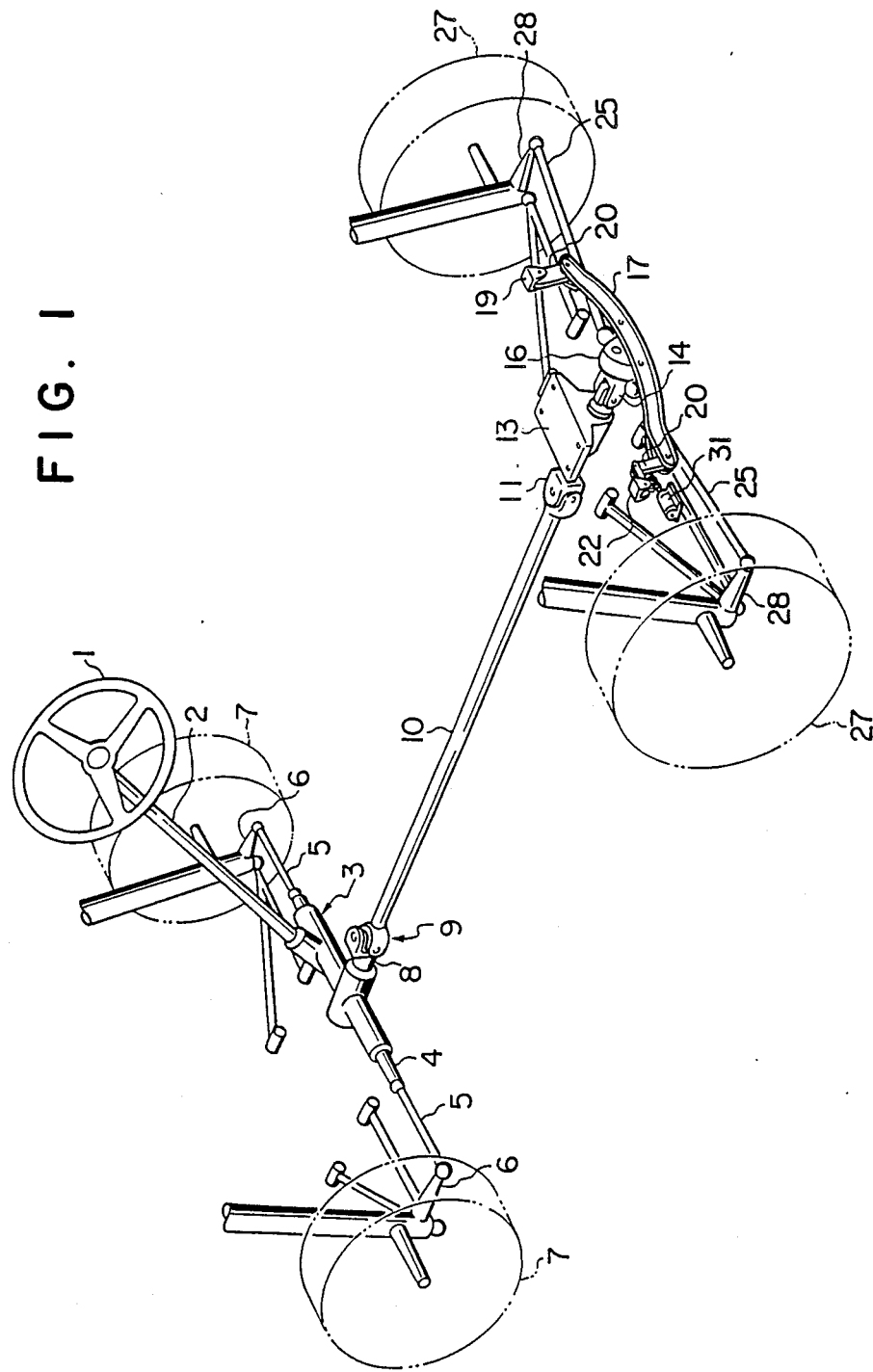
FIG. 1 is a perspective view showing the general basic structure of a vehicle provided with a front and rear wheel steering device according to this invention with the chassis of the vehicle removed.

As shown in FIG. 1, a steering column shaft 2 of a steering wheel 1 is joined into a rack and pinion type gear box 3, and a pair of tie rods 5 are connected to the two ends of a rack shaft 4 which meshes with a pinion gear (not shown in the drawings) integrally attached to the lower end of the steering column shaft 2. To the external ends of the tie rods 5 are connected a pair of knuckle arms 6 which support right and left front wheels 7, respectively, in such a manner that the front wheels 7 can be steered to the direction determined by the steering wheel 1 in the known manner.

A pinion shaft 8 extends from the gear box 3 to in the rearward direction and an elongated linkage shaft 10 is connected to the rear end of the pinion shaft 8 by way of a universal joint 9. The pinion shaft 8 is provided with a pinion gear (which is not shown in the drawings) which meshes with the rack shaft 4. And an input shaft 12 (FIG. 2) is connected to the rear end of the linkage shaft 10 by way of another universal joint 11. This input shaft 12 is disposed along the laterally central line of the rear part of the vehicle and is rotatably supported by a bearing bracket 13 as best shown in FIG. 2.

Figure 2:
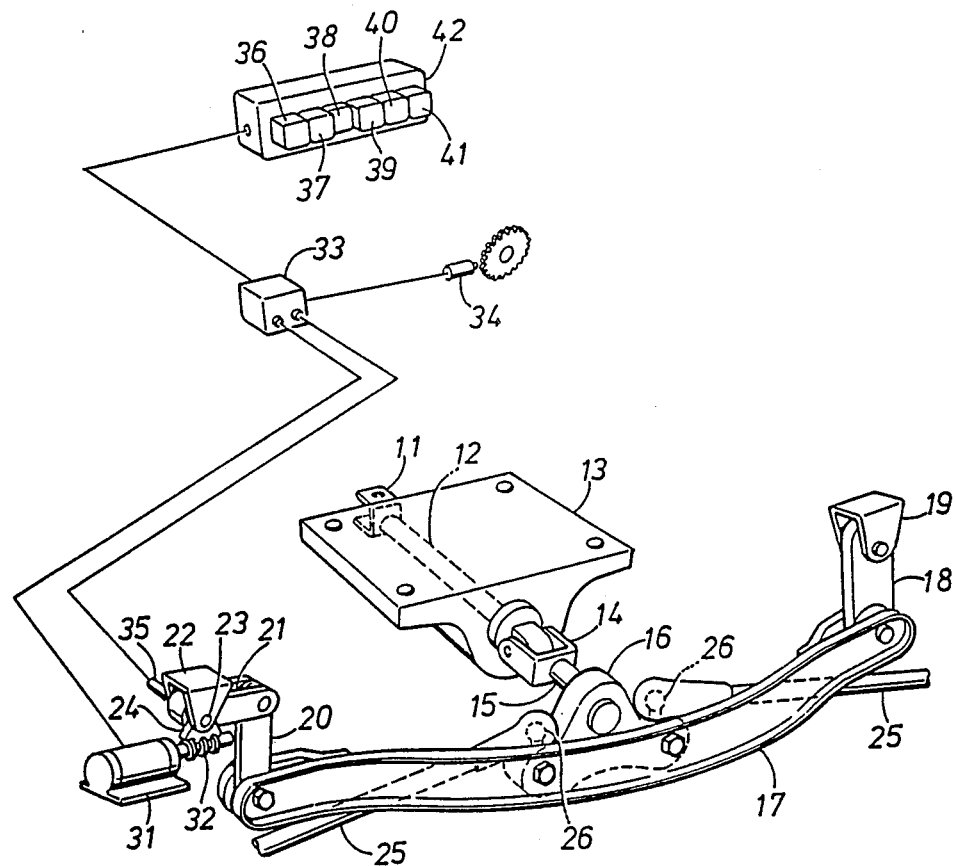
FIG. 2 is a magnified perspective view of a rear wheel steering system of the embodiment of FIG. 1.

Further, a swing shaft 15, which is described in greater detail in FIG. 2, is connected to the rear end of the input shaft 12 by way of a clevis 14, and a joint member 16 is loosely fitted over a middle portion of the swing shaft 15. The two lateral ends of the joint member 16 are connected to tie rods 25 by way of ball joints 26 respectively, and the joint member 16 is fixedly supported by a middle part of an arm member 17 which is arranged along the widthwise direction of the vehicle.

One end of the arm member 17 is connected to the vehicle body by way of a link member 18 and a link bracket 19 while the other end of the arm member 17 is connected to the vehicle body by way of link members 20 and 21 and a link bracket 22 in such a manner that the arm member 17 may be able to swing in a vertical plane which is perpendicular to the longitudinal direction of the vehicle. A pivot shaft 23 of the link member 21 on the side of the bracket 22 can rotate integrally with the link member 21. The external ends of the tie rods 25 are connected to knuckle arms 28 which support rear wheels 27 as shown in FIG. 1.

A motor 31 is mounted in a part of the vehicle body located on the side of the other end of the arm member 17 and an output shaft of the motor 31 is fixedly provided with a worm gear 32 which in turn meshes with a sector gear 24 integrally mounted to the pivot shaft 23 of the link member 21. Thus, the rotation of the motor 31 will cause the rotational motion of the arm member 17. Further, the vehicle is provided with a computer 33 which receives signals from a vehicle speed sensor 34 for detecting the vehicle speed and a position sensor 35 which detects the position of the pivot shaft 23 of the link member 21 and sends an appropriate control signal to the computer 33 according to the vehicle speed to control the rotation of the motor 31.

When the pivot point P of the joint member 16 coincides with the center O of the input shaft 12 as shown in FIG. 3(a), the input shaft 12 and the swing shaft 15 rotate in a coaxial manner, and therefore the joint member 16 will not laterally swing and the tie rods 25 remain stationary so that only the front wheels 7 are steered and the rear wheels 27 are not steered at all, in the same manner as in a conventional vehicle.

When the link member 21 is downwardly rotated by the rotation of the motor 31 by way of the worm gear 32 and the sector gear 24 meshing therewith, the arm member 17 inclines with its left end down as shown in FIG. 3(b). Due to this inclination of the arm member 17, the pivot point P is located below the axial center O and, if the input shaft 12 is rotated for instance in counter-clockwise direction by angle theta, the tie rods 25 move rightwardly as indicated by broken lines in FIG. 3(b), to steer the rear wheels 27 in the direction opposite to the steering direction of the front wheels 7.

When the link member 21 is upwardly rotated by reverse rotation of the motor 31, the arm member 17 inclines with its left end up as shown in FIG. 3(c). Due to this inclination of the arm member 17, the pivot point P is located above the axial center O and, if the input shaft 12 is rotated for instance likewise in counter-clockwise direction by angle theta, the tie rods 25 move leftward, as opposed to the previous case, as indicated by broken lines in FIG. 3(c), to steer the rear wheels 27 in the same direction as the front wheels 7.

Now the control action of the above-described embodiment will be described in the following with reference to FIGS. 4 and 5.

Figure 4:
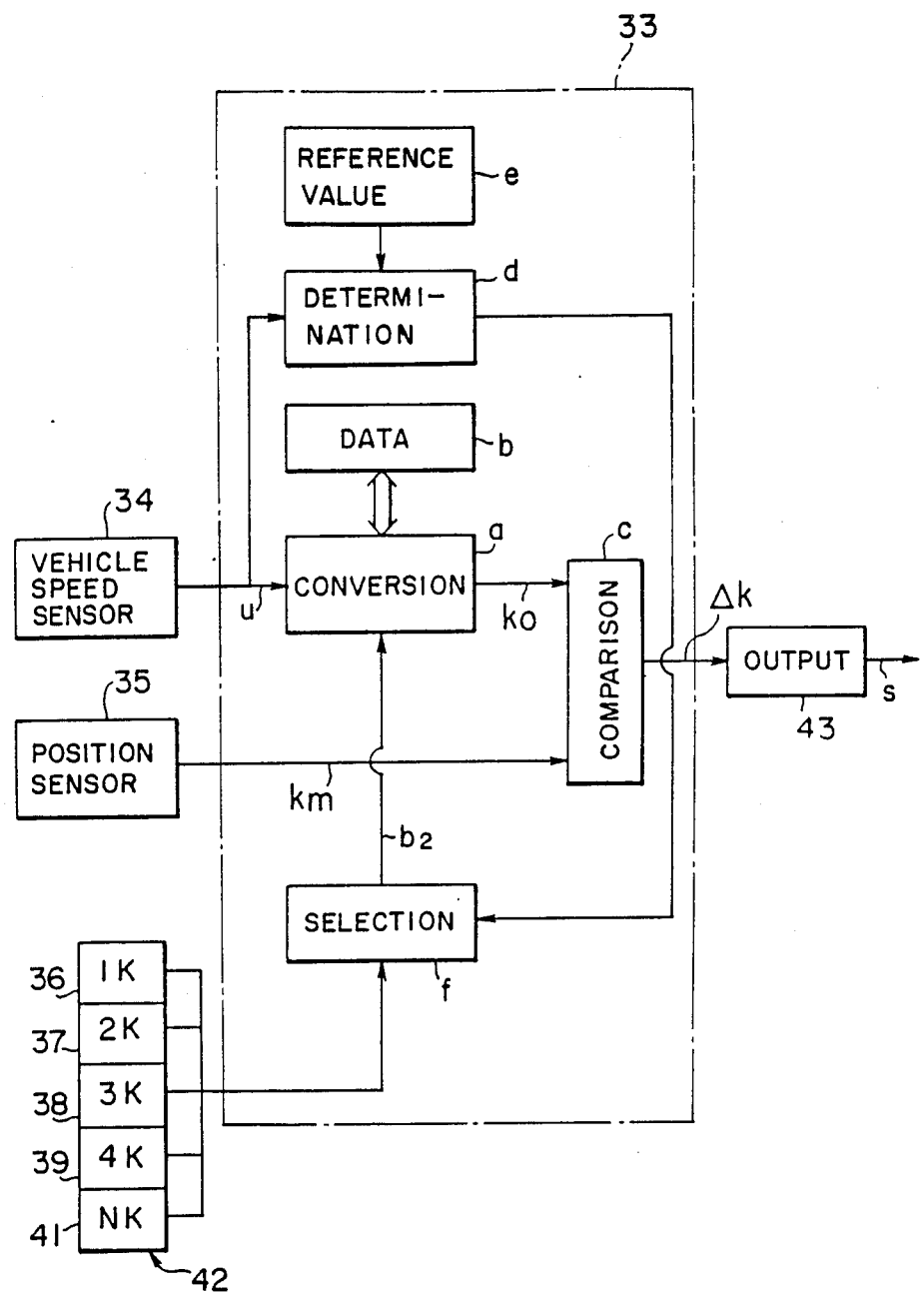
FIG. 4 is a functional block diagram of the embodiment of FIGS. 1 to 3.
Figure 5:
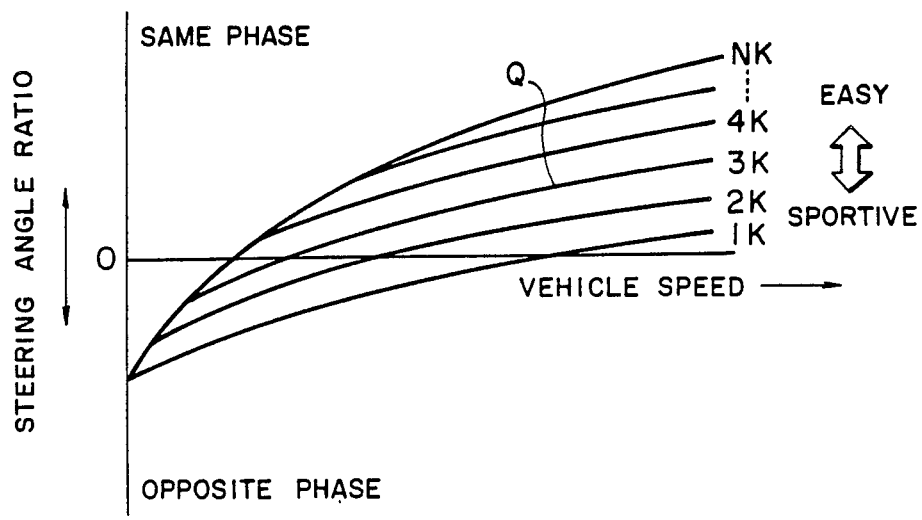
FIG. 5 is a graph showing the steering angle ratios which may be manually selected under certain conditions.

FIG. 4 shows the functional structure of the computer 33. The vehicle speed signal detected by the vehicle speed sensor 34 is supplied to the computer 33 as a certain vehicle speed signal u. This vehicle speed signal u is converted into a predetermined steering angle ratio signal $k_0 (=f(u))$ by a conversion process (a) according to a certain mathematical function of the vehicle speed such as can be readily determined in accordance with known methods by those skilled in the art. In the conversion process (a), the vehicle speed signal u is converted into steering angle ratio data according to one of a plurality of conversion characterstics shown in FIG. 5 through a selected one of a plurality of function data $f_1$, $f_2$, ... (b), selected for use in the conversion process (a) and stored in memory of the computer 33.

The selection of function data in the conversion process (a) may be accomplished as follows: Selection information $b_2$ selected on the selector switch 42 is given to the conversion process (a) by way of a selection process (f), and one of a plurality of the characteristic curves shown in FIG. 5, or predetermined steering angle ratio properties 1K, 2K, ... nK is selected. These properties are associated with the push-buttons 36 to 41 in the manual selector 42 and the conversion process (a) converts the actual vehicle speed to corresponding steering angle ratio data according to the property selected from the conversion properties of FIG. 5.

The position sensor 35 detects the rotational position of the link member 21 which is proportional to the steering angle ratio in actual steering and the detected result is supplied to the computer 33 as an actual steering angle ratio $k_m$. A relative difference delta $k = k_m - k_0$ is obtained by a comparison process (c). This difference delta k is supplied from the computer 33 to an output control device 43 as data corresponding to the correction of the steering angle ratio which is required to obtain the desired steering angle ratio. The output end of the output control device 43 is connected to the motor 31 and supplies thereto a control signal s corresponding to the difference delta k. Thus, the motor 31 is rotated in the direction which accomplishes the steering angle ratio corresponding to the current vehicle speed.

The properties of the steering angle ratio functions corresponding to the vehicle speed are so set up that a plurality of characteristic curves 1K, 2K, 3K, ... are branched off from a curve corresponding to nK in a mutually parallel manner, and the properties towards the characteristic curve 1K correspond to sportive dynamic properties while the characteristic curves of higher numbers 2K, 3k ... correspond to easier driving or steering.

Further, in the computer 33, the vehicle speed signal u from the vehicle speed sensor 34 and the predetermined reference vehicle speed data (e) are compared in a determination process (d) and it is determined whether the actual vehicle speed is greater than this reference vehicle speed data (e) or not. If the actual vehicle speed data is greater than the reference vehicle speed data (e), the determination result is given to a selection process (f) and a correction signal $b_2$ for manual selection is terminated. Therefore, when the vehicle speed is lower than a certain vehicle speed the steering angle ratio functions can be freely changed by operating the manual selector 42, but, if the vehicle speed is higher than the certain vehicle speed, the selection made on the manual selector 42 is disregarded and the steering angle ratio changes with the vehicle speed according to the already selected function property or a default property 3K for instance.

Thus, according to this embodiment of the present invention, there is provided the conveniences which may be derived from the free choice of the steering angle ratio functions according to the objective factors such as road conditions and subjective factors such as the liking of the driver, in addition to the advantages of a front and rear wheel steering, i.e., favorable driving response in high speed range and good maneuverability in low speed range, and the present embodiment can further prevent the inconvenience of the possible need for a driver to take a brisk steering action to correct a sudden change in the dynamic properties of the vehicle as a result of a manual selection in medium to high speed ranges since such a manual selection is prohibited in higher speed ranges by the determination process (d) which compares the actual vehicle speed with a certain reference value and restricts the action of the selection process (f) if the actual vehicle speed is higher than the reference value.

Figure 6:
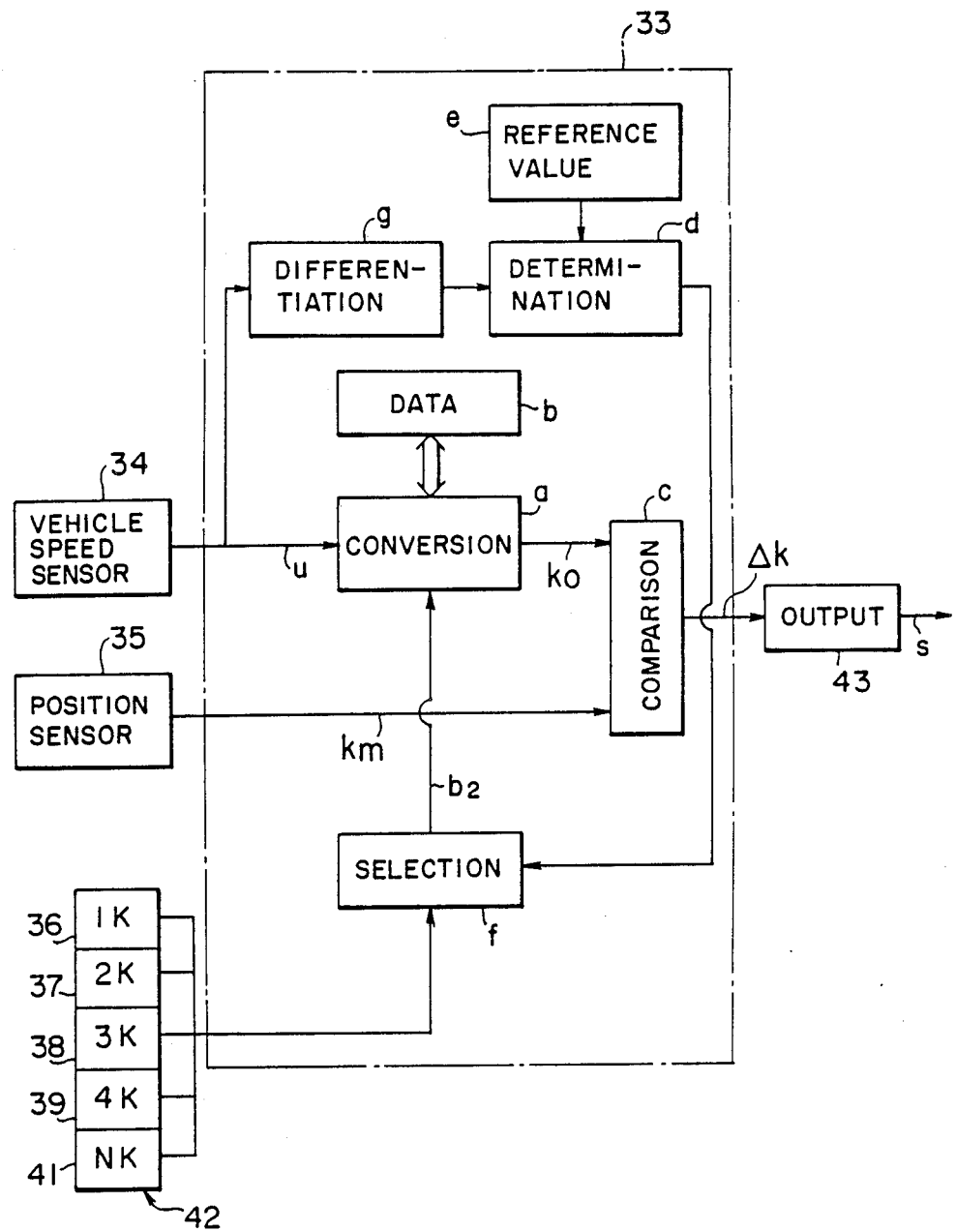
FIG. 6 is a functional block diagram similar to FIG. 4 of a second embodiment of the present invention.

FIG. 6 shows a second embodiment of the present invention. According to the present embodiment, manual selection of the steering angle ratio for the rear wheels is prohibited when the vehicle acceleration exceeds a certain value. FIG. 6 shows the control structure of the second embodiment and those parts corresponding to the previous embodiment are denoted by like numerals and symbols and their detailed descriptions are omitted for avoiding unnecessary repetition of disclosure.

According to the present embodiment, the vehicle speed signal u from the vehicle speed sensor 34 is supplied to the determination process (d) after being differentiated in a differentiation circuit (g) which may be incorporated in the computer 33 and it is determined in the determination process (d) whether the the change rate of the vehicle speed is greater than the value of a predetermined reference change rate of the vehicle speed stored as a reference value (e) or not. If the actual change rate of the vehicle speed is greater than the reference change rate of the vehicle speed, the determination result is given to the selection process (f) and a correction signal $b_2$ for manual selection is restricted.

Therefore, when the change rate of the vehicle speed is greater than a certain value, the selection process (f) maintains the already set up default function property and will not let the function property be changed even when the a manual modification of the function property is attempted on the manual selector 42.

In this conjunction, the reference value of the change rate of the vehicle speed (e) which determines the condition for performing the above-described restriction is selected as a value which will not cause a sudden change in the motion of the vehicle. Normally, the vehicle speed change rate may be selected so as to be compared with the absolute value of the actual vehicle speed change rate, but may also be selected so as to give different limit values for acceleration and deceleration.

Thus according to this embodiment, manual selection of the steering angle ratio for the rear wheels is prohibited during acceleration and/or deceleration of the vehicle so that any sudden change in the steering angle ratio may be prevented when such a sudden change is not desirable.

Figure 7:
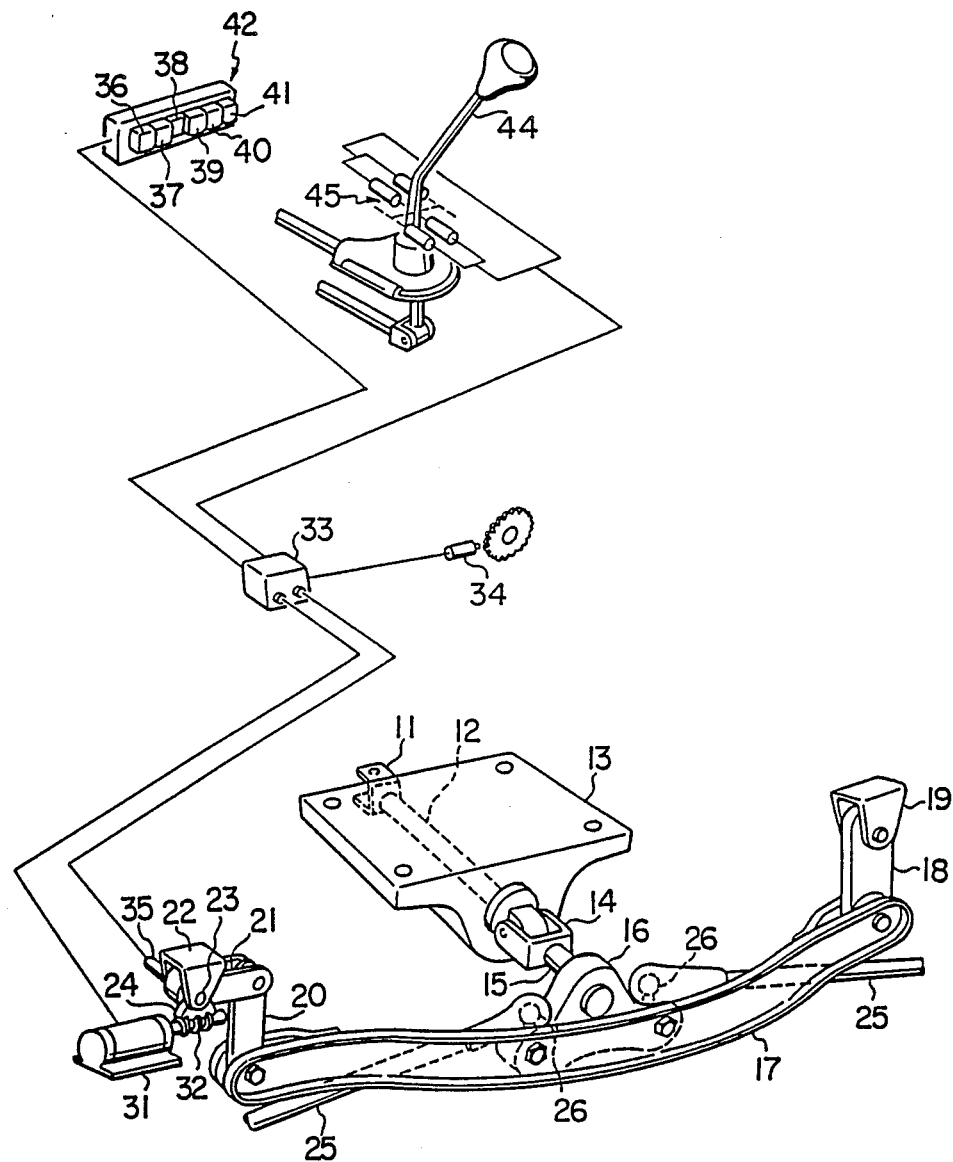
FIG. 7 is a magnified perspective view similar to FIG. 2 showing a third embodiment of the present invention.
Figure 8:
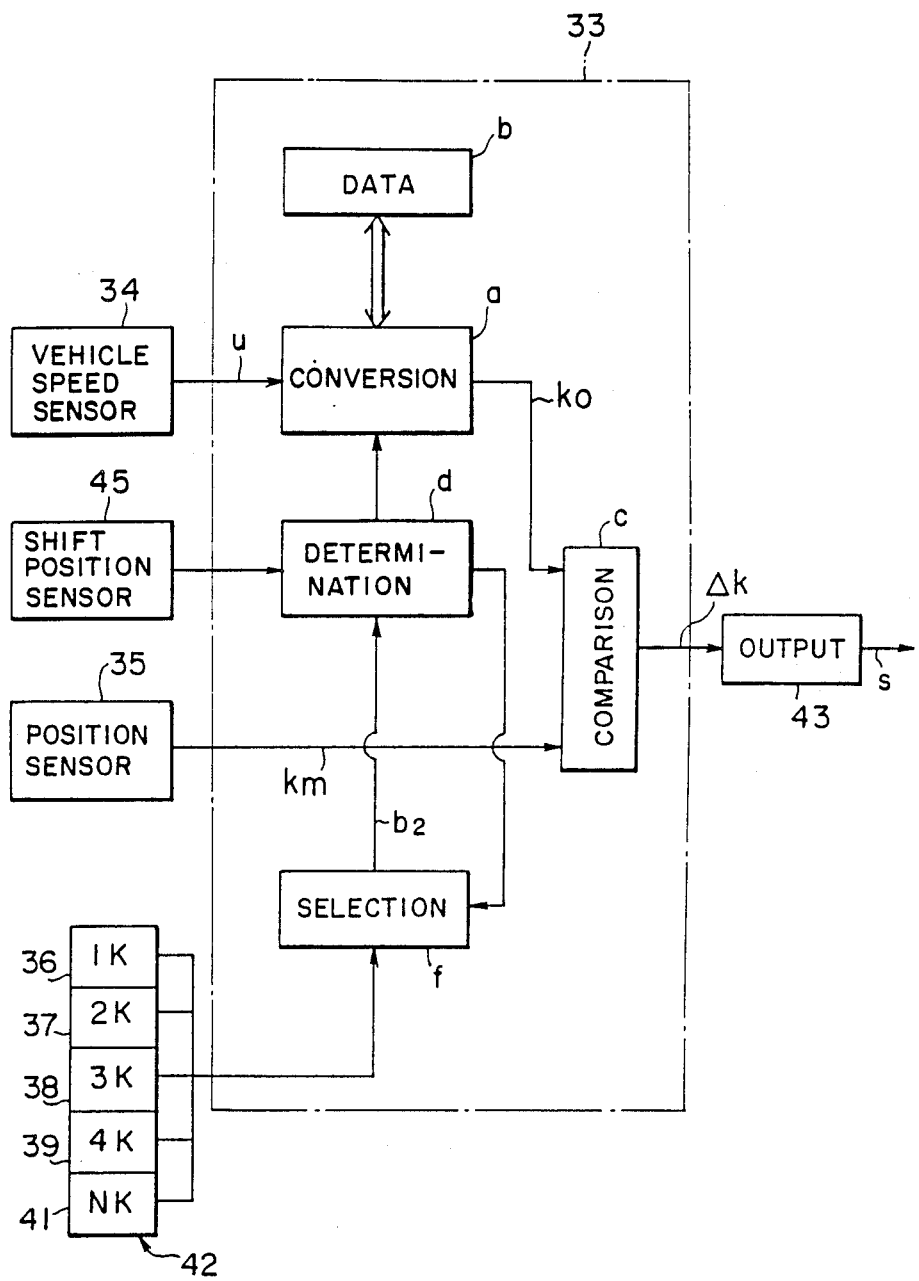
FIG. 8 is a functional block diagram similar to FIG. 4 of the third embodiment of the present invention.

FIGS. 7 and 8 show a third embodiment of the present invention. According to the present embodiment, manual selection of the steering angle ratio for the rear wheels is prohibited when the shift position of the transmission of the vehicle is in a high speed position. FIGS. 7 and 8 schematically shows the control structure of the third embodiment and those parts corresponding to the previous embodiments are denoted by like numerals and symbols and their detailed descriptions are omitted for avoiding unnecessary repetition of disclosure.

According to the present embodiment, a shift position sensor 45, connected to the computer 33, is arranged at the foot of a shift lever 44 of a transmission and supplies a signal indicating the shift position of the shift lever 44 to the computer 33. In the case of the illustrated embodiment, the shift position sensor 45 comprises limit switches provided in the shift positions other than the "low" and "reverse" positions. However, the structure of the sensor is not limited by the present embodiment, it is also possible to provided limit switches in all the shift positions or, alternatively, to provided limit switches to the "low", "reverse" and "neutral" positions. And, the switches may not be mechanical limit switches but may also be of other types such as photo-sensors. When an automatic transmission is used as the transmission, the shift positions of the transmission gears my be detected by arranging such sensors in the interior of the automatic transmission.

As shown in FIG. 8, the vehicle speed signal detected by the vehicle speed sensor 34 is processed in the same way as in the first embodiment. But, according to the present embodiment, the determination process (d) is executed according to the signal from the shift position sensor 45. In this determination process (d), it is determined whether the shift position is in one of the low speed shift positions, i.e., "low", "reverse" and "neutral" positions, or not. If the shift position is not in any of the low speed shift positions or, in other words it is, in any of high speed positions, the determination result is given to the selection process (f) and the output of correction information $b_2$ for manual selection of the steering angle ratio properties is restricted.

Therefore, when the shift position in one of the low speed positions or, in other words, the vehicle speed is low, the steering angle ratio function can be freely modified with the manual selector 42, but, when the shift position is in one of the high speed positions or the vehicle speed is high, the selection made on the manual selector 42 is disregarded and the steering angle ratio changes with the vehicle speed according to an already selected default functional property. In this connection, if the manual selector 42 is operated when the shift position is in one of the high speed positions, the manual selection may be totally disregarded without preserving the selected state or, alternatively, the selected state may be revived when the shift position is restored to one of the low speed positions.

Thus, according to the present embodiment, the need for a driver to take a brisk steering action to correct a sudden change in the dynamic properties of the vehicle as a result of a manual selection in medium to high speed ranges is prevented by detecting such a state of the vehicle from the shift position of the transmission of the vehicle.

Figure 9:
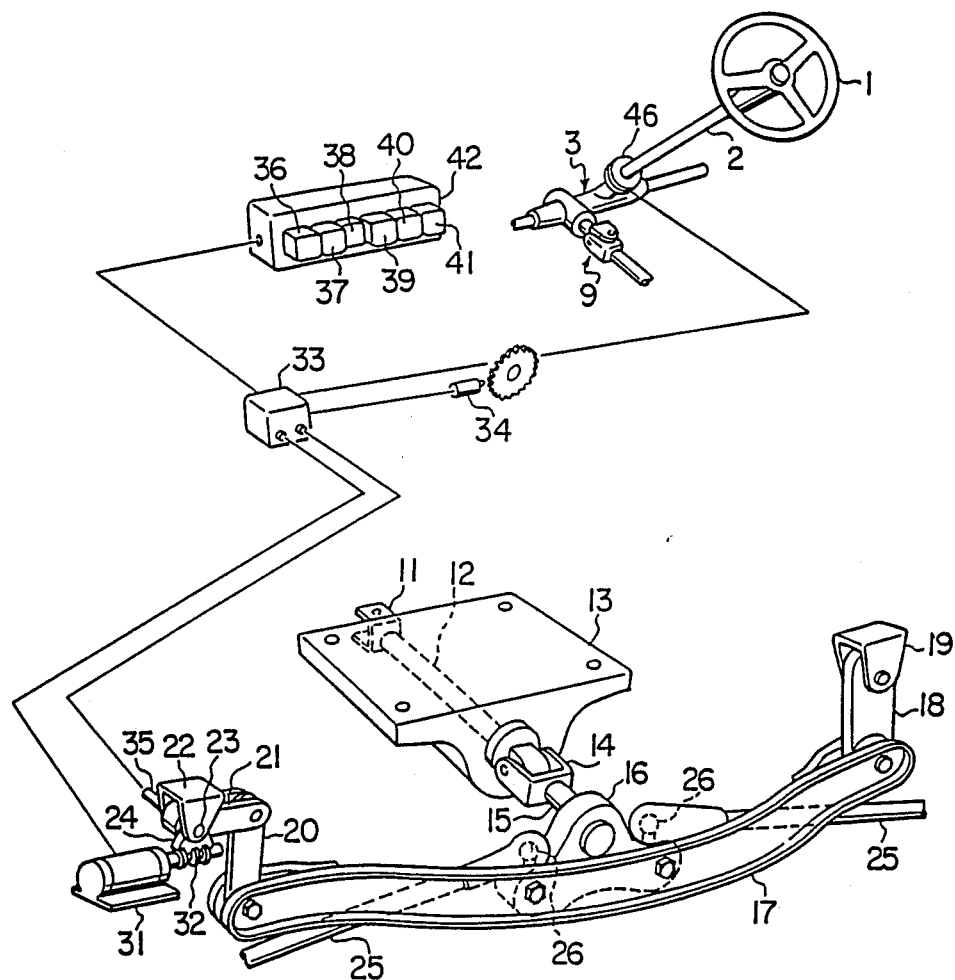
FIG. 9 is a magnified perspective view similar to FIG. 2 showing a fourth and a fifth embodiments of the present invention.
Figure 10:
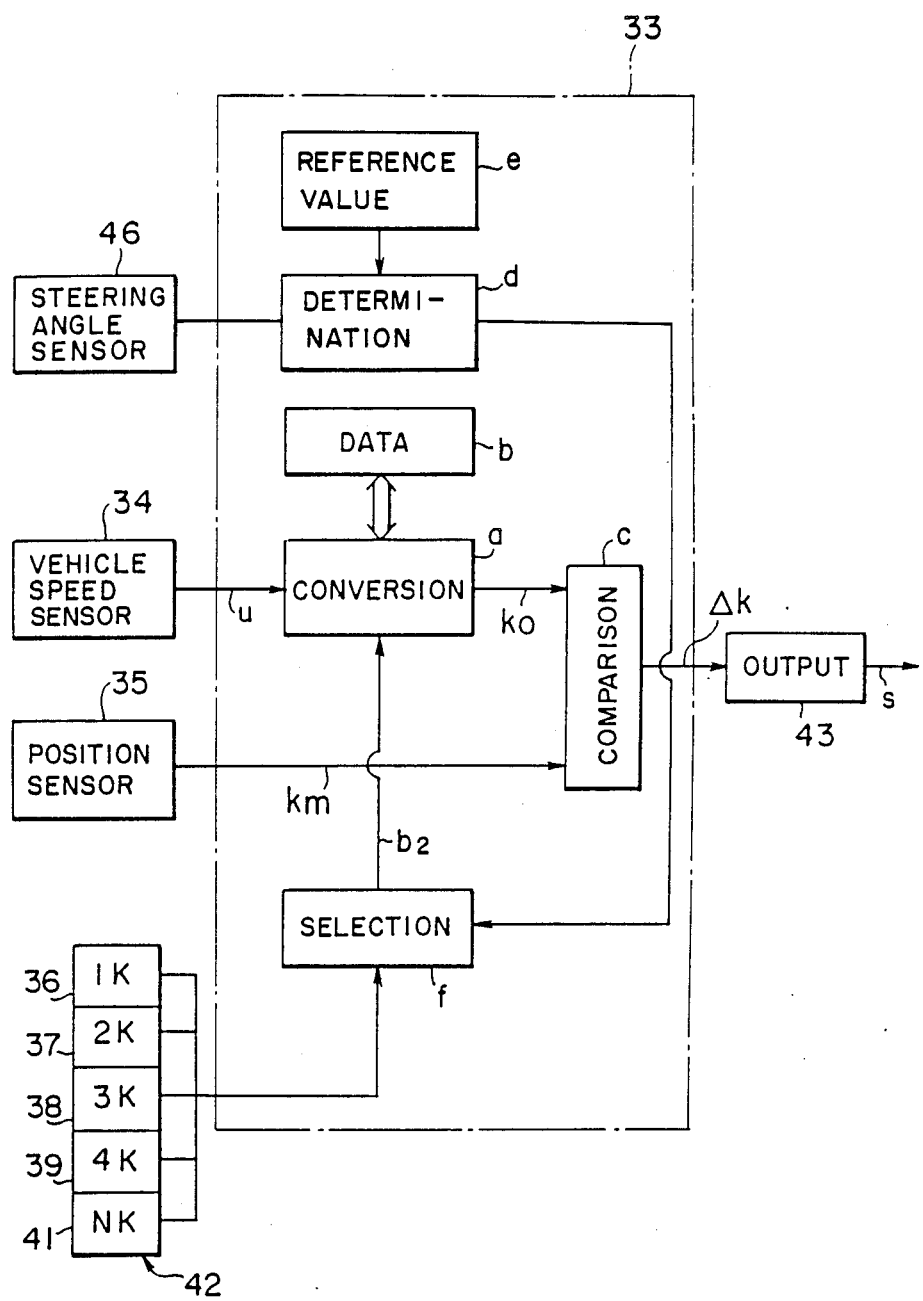
FIG. 10 is a functional block diagram similar to FIG. 4 of the fourth embodiment of the present invention.

FIGS. 9 and 10 show a fourth embodiment of the present invention. According to the present embodiment, manual selection of the steering angle ratio for the rear wheels is prohibited when the vehicle is about to make a turn. FIGS. 9 and 10 show the control structure of the fourth embodiment and those parts corresponding to the previous embodiments are denoted by like numerals and symbols and their detailed descriptions are omitted for avoiding unnecessary repetition of disclosure.

According to the present embodiment, a steering angle sensor 46 is provided at the foot of the steering shaft 2. This sensor may be comprised of a limit switch, a potentiometer or an electromagnetic sensor which can produce a signal representing the rotational angle of the steering shaft 2 or the steering angle of the front wheels. The output of this steering sensor 46 is connected to the computer 33.

FIG. 10 shows the functional structure of the computer 33. According to the present embodiment, the determination process (d) is executed according to the signal from the steering angle sensor 46. In this determination process (d), it is determined whether the steering angle signal is greater than predetermined reference steering angle data (e) or not. If the actual steering angle of the front wheels is greater than a certain steering angle range, the determination result is given to the selection process (f) and the output of correction information $b_2$ for manual selection of the steering angle ratio properties is terminated.

Therefore, if the steering angle ratio is being controlled according to a pre-selected functional property and the steering angle of the front wheels exceeds a certain range, the selection made on the manual selector 42, even when such a selection is attempted, is disregarded and the steering angle ratio changes with the vehicle speed according to an already selected functional property.

In this connection, the reference steering angle data for determining the condition of the activation of the limiting means is so selected as not to cause a sudden change in the motion of the vehicle. Normally, the steering angle data is compared with the absolute value of the actual steering angle in the determination process (d), but it is also possible to perform the determination process according to a composite value of the steering angle and the change rate of the steering angle.

Thus, the present embodiment can prevent the inconvenience of the possible need for a driver to take a brisk steering action to correct a sudden change in the dynamic properties of the vehicle as a result of a manual selection of the steering angle ratio when the vehicle is about to make a sharp turn.

Figure 11:
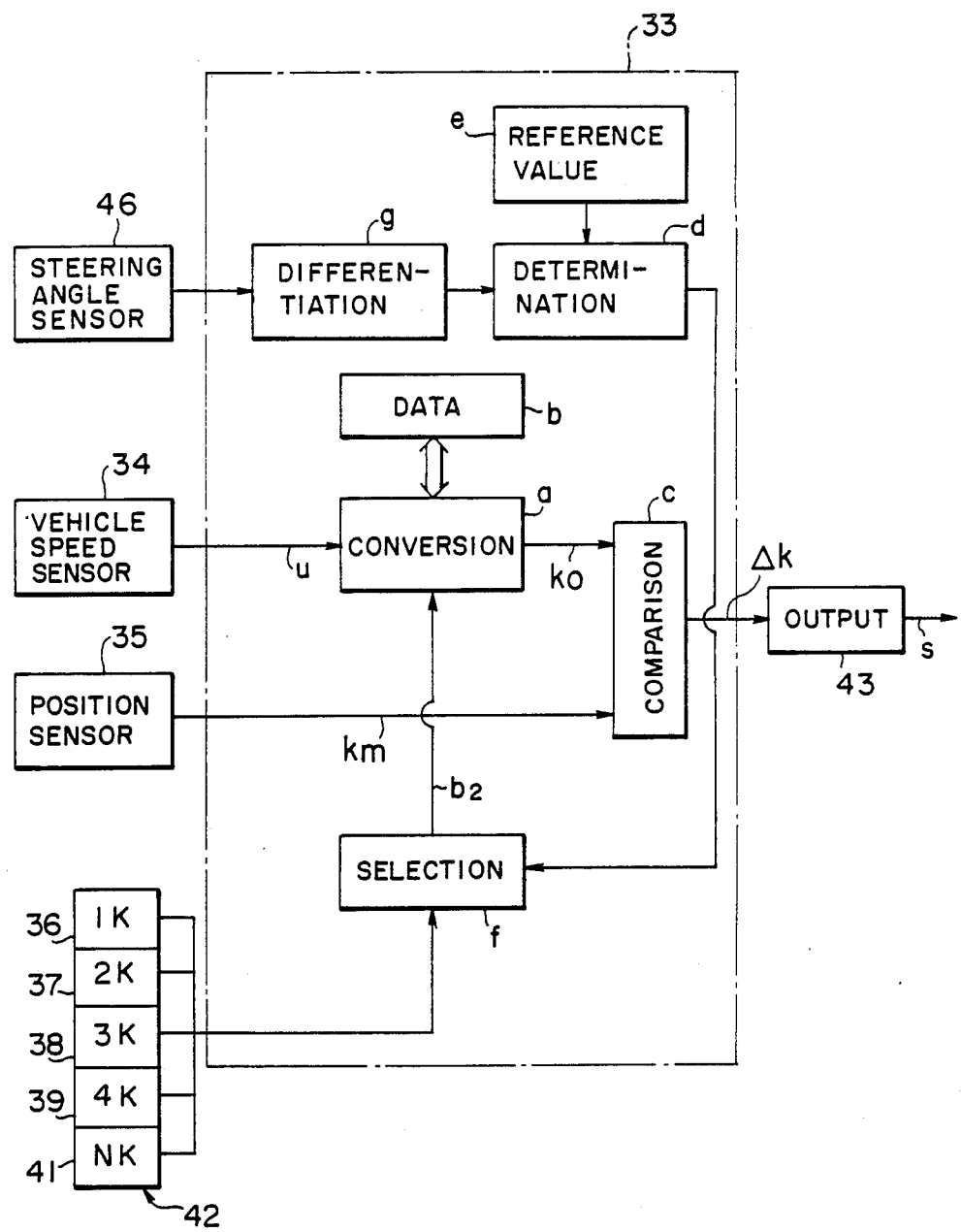
FIG. 11 is a functional block diagram similar to FIG. 4 of the fifth embodiment of the present invention.

FIG. 11 shows a fifth embodiment of the present invention. According to the present embodiment, manual selection of the steering angle ratio for the rear wheels is prohibited when the change rate of the steering angle of the front wheels or the change rate of the steering input from the steering wheel 1 exceeds a certain value. FIG. 11 shows the control structure of the fifth embodiment and those parts corresponding to the previous embodiments are denoted by like numerals and symbols and their detailed descriptions are omitted for avoiding unnecessary repetition of disclosure.

In the same way as in the previous embodiment, a steering angle sensor 46 is provided at the foot of the steering shaft 2 as shown in FIG. 9. And, as shown in FIG. 11, the output of this steering sensor 46 is connected to the computer 33 by way of a differentiation circuit (g) which may be incorporated in the computer 33.

Thus, in the computer 33, the steering angle signal from the steering angle sensor 46 is differentiated (g) to obtain a steering angle change rate signal and a determination process (d) is executed according to this signal. In this determination process (d), it is determined whether the change rate of the steering angle signal is greater than predetermined reference steering angle change rate data (e) or not. If the change rate of the actual steering angle of the front wheels is greater than a certain steering angle change rate range, the determination result is given to the selection process (f) and the output of correction information $b_2$ for manual selection of the steering angle ratio properties is terminated.

Therefore, if the steering angle ratio is being controlled according to a pre-selected functional property and the change rate of the steering angle of the front wheels exceeds a certain range, the selection made on the manual selector 42, even when such a selection is attempted, is disregarded and the steering angle ratio changes with the vehicle speed according to an already selected functional property.

In this connection, the reference steering angle change rate data for determining the condition of the activation of the limiting means is so selected as not to cause a sudden change in the motion of the vehicle. Normally, the steering angle change rate data is compared with the absolute value of the actual change rate of the steering angle in the determination process (d), but it is also possible to perform the determination process according to a composite value of the steering angle and the change rate of the steering angle.

Although the present invention has been described in terms of the specific embodiments thereof, it is obvious to a person skilled in the art that it is possible to modify the present invention without departing from the spirit of the invention. For instance, if necessary, it may be so arranged that the modification of the steering angle ratio function is only gradually made with some time delay when the vehicle speed is less than the reference vehicle speed $u_r$, whereby a sudden steering of the rear wheels due to the change in the steering angle ratio function may be avoided even in low speed range.

In the above-described embodiment, the various processes conducted in the computer 33 are executed by a certain program (software) stored for instance in a storage area of the computer 33, but it is possible to utilize electric circuitry having a similar functionality to perform the same processes. And, although the manual selector comprised push-button switches but may consist of a slider mean which is continuously variable.

Further, this invention is not limited by the above-described embodiments, but may also be applied to front and rear wheel steering devices in which the front and the rear wheels are hydraulically controlled and the front steering angle information is transmitted by hydraulic pressure, or the front wheel steering angle is transmitted to the computer 33 as an electric signal.

We claim:

1. A front and rear wheel steering device for vehicle for variably controlling the steering angle ratio of rear wheels relative to the steering angle of front wheels according to vehicle speed, comprising:
   a vehicle speed sensor for detecting an actual vehicle speed;
   storage means for storing a plurality of mathematical functions, including a default mathematical function, representing different steering angle ratio characteristics;
   manual selection means for selecting one of the mathematical functions of the vehicle speed stored in the storage means;
   means for achieving a steering angle ratio according to the mathematical function selected on the manual selection means;
   limiting means which prohibits the manual selection of the mathematical functions other than the default mathematical function according to a predetermined vehicle condition.

2. A front and rear wheel steering device as defined in claim 1, wherein the default mathematical function has negative values in a low speed range and positive values in a high speed range, and the other mathematical functions branch off from the default mathematical function in a low speed range and extend substantially parallel to the default mathematical function in a high speed range.

3. A front and rear wheel steering device as defined in claim 1 or 2, wherein the limiting means prohibits the manual selection of the mathematical functions when the actual vehicle speed is greater than a certain value.

4. A front and rear wheel steering device as defined in claim 1 or 2, wherein the limiting means prohibits the manual selection of the mathematical functions when the absolute value of the change rate of the actual vehicle speed is greater than a certain value.

5. A front and rear wheel steering device as defined in claim 1 or 2, wherein the limiting means prohibits the manual selection of the mathematical functions when the change rate of the actual vehicle speed is greater than a certain positive value or smaller than a certain negative value.

6. A front and rear wheel steering device as defined in claim 1 or 2, wherein the limiting means prohibits the manual selection of the mathematical functions when the shift position of the vehicle is in a high speed position.

7. A front and rear wheel steering device as defined in claim 1 or 2, wherein the limiting means prohibits the manual selection of the mathematical functions when the actual steering speed of the front wheels is greater than a certain value.

8. A front and rear wheel steering device as defined in claim 1 or 2, wherein the limiting means prohibits the manual selection of the mathematical functions when the change rate of the actual steering speed of the front wheels is greater than a certain value.

9. A front and rear wheel steering device as defined in claim 1 or 2, wherein the limiting means prohibits the manual selection of the mathematical functions when a composite value of the actual steering speed and the change rate of the actual steering speed of the front wheels is greater than a certain value.

* * * * *